US008233895B2

(12) United States Patent
Tysowski

(10) Patent No.: US 8,233,895 B2
(45) Date of Patent: Jul. 31, 2012

(54) METHODS AND APPARATUS FOR USE IN TRANSFERRING USER DATA BETWEEN TWO DIFFERENT MOBILE COMMUNICATION DEVICES USING A REMOVABLE MEMORY CARD

(75) Inventor: Piotr Konrad Tysowski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/952,503

(22) Filed: Nov. 23, 2010

(65) Prior Publication Data

US 2011/0066864 A1    Mar. 17, 2011

Related U.S. Application Data

(63) Continuation of application No. 11/624,061, filed on Jan. 17, 2007, now Pat. No. 7,865,212.

(51) Int. Cl.
  *H04M 3/00* (2006.01)
  *G06F 3/00* (2006.01)
(52) U.S. Cl. ........ 455/419; 380/247; 380/260; 380/277; 380/278; 380/283; 455/411; 455/420; 455/466; 455/557; 455/558; 709/248; 710/8; 710/13; 710/62; 710/301; 711/115; 711/162; 713/162; 713/193
(58) Field of Classification Search .................. None
See application file for complete search history.

(56) References Cited

U.S. PATENT DOCUMENTS

| 6,691,149 B1 | 2/2004 | Yokota et al. ................. 709/201 |
| 7,426,398 B2 * | 9/2008 | Reisgies ........................ 455/466 |
| 7,643,824 B2 * | 1/2010 | Onyon et al. ................. 455/419 |
| 2003/0056050 A1 * | 3/2003 | Moro ............................ 710/301 |
| 2003/0226011 A1 * | 12/2003 | Kuwano et al. ............... 713/155 |
| 2004/0106396 A1 * | 6/2004 | Segura et al. .............. 455/414.1 |
| 2004/0142684 A1 | 7/2004 | Ratert et al. ................... 455/420 |
| 2004/0162057 A1 | 8/2004 | Steininger ..................... 455/411 |
| 2004/0204085 A1 * | 10/2004 | Vargas et al. ................. 455/557 |
| 2005/0009563 A1 * | 1/2005 | Stenmark ...................... 455/558 |

(Continued)

FOREIGN PATENT DOCUMENTS

DE           10146664 A1    2/2003

(Continued)

OTHER PUBLICATIONS

'Logica Open Source SMPP 1.3: Class TLV' from http://opensmpp.logica.com/CommonPart/Documentation/javadoc/library_1_3/com/logica/smpp/pdu/tlv/TLV.html, copyright 1996-2001, Logica Mobile Networks Limited.*

(Continued)

*Primary Examiner* — Steven Snyder
(74) *Attorney, Agent, or Firm* — John J. Oskorep, Esq.

(57) ABSTRACT

A source device is initially enabled to maintain data synchronization with a host server over a wireless communication network via a first wireless transceiver for user data of an application program associated with a user account. To enable a target device, the source device is operative to establish a programming session with the target device via a second wireless transceiver. During the programming session, the source device causes user account data (e.g. an encryption/decryption key for the data-synchronized communications) for the user account to be transmitted to the target device via the second wireless transceiver. The user data associated with the application program may be transferred from the source device to the target device via a removable memory card such as a secure digital (SD) card.

20 Claims, 10 Drawing Sheets

U.S. PATENT DOCUMENTS

| | | | |
|---|---|---|---|
| 2005/0107114 A1 | 5/2005 | Ocock | 455/550.1 |
| 2005/0113079 A1 | 5/2005 | Guo | 455/418 |
| 2005/0136979 A1 | 6/2005 | Dietl et al. | 455/558 |
| 2005/0153740 A1 | 7/2005 | Binzel et al. | 455/558 |
| 2005/0160277 A1* | 7/2005 | Sciupac | 713/185 |
| 2005/0170827 A1* | 8/2005 | Nagashima | 455/419 |
| 2005/0205664 A1 | 9/2005 | Kormann et al. | 235/380 |
| 2005/0208967 A1* | 9/2005 | Buniatyan | 455/557 |
| 2005/0223143 A1* | 10/2005 | Kang et al. | 710/62 |
| 2006/0094466 A1* | 5/2006 | Tran | 455/558 |
| 2006/0154659 A1 | 7/2006 | Roter et al. | 455/422.1 |
| 2006/0223582 A1* | 10/2006 | Simola | 455/558 |
| 2006/0240868 A1* | 10/2006 | Kaplan et al. | 455/558 |
| 2006/0281441 A1* | 12/2006 | Okochi | 455/411 |
| 2006/0282553 A1* | 12/2006 | Miller et al. | 710/11 |
| 2007/0179989 A1 | 8/2007 | Maes | 707/201 |
| 2008/0280644 A1 | 11/2008 | Hugot | 455/556.2 |
| 2009/0063593 A1 | 3/2009 | Okabayashi et al. | 707/205 |

FOREIGN PATENT DOCUMENTS

| | | |
|---|---|---|
| EP | 1528732 A1 | 5/2005 |
| JP | 2002199089 A | 7/2002 |

OTHER PUBLICATIONS

European Search Report & Written Opinion for EP Application #07100695.1, Jul. 9, 2007.

Office Action of Jun. 23, 2010, U.S. Appl. No. 11/624,031, filed Jan. 17, 2007.

"Logica Open Source SMPP 1.3: Class TLV", 1996-2001, Logica Mobile Networks Limited, http://opensmpp.logica.com/commonpart/documentation/jayadoc/library_1_3/com/logica/smpp/pdu/tlv/TLV.html.

"Key Exchange" Jan. 5, 2011, http://en.wikipedia.org/wiki/key exchange.

"Logica Open SMPP Introduction", Jan. 5, 2011, http://opensmpp.logica.com/CommonPart/Introduction/Introduction.htm.

* cited by examiner

METHODS AND APPARATUS FOR USE IN TRANSFERRING USER DATA BETWEEN TWO DIFFERENT MOBILE COMMUNICATION DEVICES USING A REMOVABLE MEMORY CARD

CROSS-REFERENCED TO RELATED APPLICATION

The present application is a continuation of and claims priority to U.S. non-provisional application having application Ser. No. 11/624,061 and filing date of 17 Jan. 2007, now U.S. Pat. No. 7,865,212, which is hereby incorporated by reference herein.

BACKGROUND

1. Field of the Technology

The present disclosure relates generally to mobile communication devices which operate in wireless communication networks, and more particularly to methods and apparatus for transferring user data from one mobile communication device to another mobile communication device using a removable memory card.

2. Description of the Related Art

A mobile communication device, such as a mobile station, may be adapted to communicate with other devices via wireless radio frequency (RF) signals through a wireless communication network. Such a mobile communication device may be further operative to maintain data synchronization with a host server over the wireless communication network for user data of an application program associated with a user account. The application program may be or include, for example, an electronic mail (e-mail) application program for the communication of e-mail messages. For the data-synchronized communications, the host server maintains storage of a mapping of a user account name or identifier of the user account with a personal identification number of the mobile communication device. When communications are required with the mobile communication device, the personal identification number of the mobile communication device is used to route the messages to/from the device through the system.

Today, it is not uncommon for an individual to possess or own two different mobile communication devices for different uses. For example, the end user may desire to use a business model in the office during the weekdays (e.g. a mobile device having a QWERTY keyboard for e-mail communications), but may alternatively desire to use a consumer model over the weekend (e.g. a mobile device having a Suretype keypad and camera) while staying in touch with the office via e-mail. Thus, it is desirable that an end user be able to utilize one of two different mobile devices for the data-synchronized communications associated with the user account.

If switching of communications associated with user account were possible, it would be desirable that this device switch take less time than when performing a full backup/restore operation via a desktop manager on a computer. Wired connections between any of the mobile devices and any computer or server would be undesirable, as it would be most preferable that the end user could simply carry the two mobile devices on his person and perform the switch at any time. Further, the end user should not need to obtain an "out-of-band" user name and password from the network administrator to activate on the new mobile device. It would also be preferable that the new mobile device be automatically provided with a valid set of encryption/decryption keys for the data-synchronized communications, and this key transfer should occur through secure means. Settings that are specific to a mobile device, such as display, profile, owner info, and theme settings, must be preserved. The SIM card may or may not need to be transferred, as the end user may wish to make voice and data connections on a company SIM card regardless of the device utilized or alternatively on a personal SIM card outside of business hours per company policy.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Methods and apparatus for use in transferring user data from a first ("source") mobile communication device to a second ("target") mobile communication device using a removable memory card are described herein. The source and target devices may be possessed and/or owned by the same end user. The source device is initially enabled to maintain data synchronization with a host server over a wireless communication network via a first wireless transceiver (e.g. a cellular transceiver) for user data of an application program (e.g. an e-mail application program) associated with the user account. To enable the target device for the communications associated with the user account, the source device is operative to establish a programming session with the target device via a second wireless transceiver (e.g. a short-range wireless transceiver). During the programming session, the source device causes user account data (e.g. at least one encryption/decryption key for the data-synchronized communications) for the user account to be transmitted to the target device via the second wireless transceiver. Preferably, the user account data is encrypted based on a passkey for the programming session. The user data associated with the application program may also be transferred from the source device to the target device during the programming session. With this data, the target device is thereby enabled to maintain data synchronization with the host server for the user data of the application program associated with the user account.

In the preferred embodiment, the source device is operative to maintain data synchronization with the host server over the wireless communication network for the user data, store the user data in memory of the source device, and further copy the user data in a removable memory card (e.g. a secure digital or SD card) in the source device. When the user data is desired at the target device, the removable memory card is physically transferred from the source device to the target device. After the removable memory card is inserted in the target device, the processor of the target device causes the user data to transferred from the removable memory card to memory of the target device where it is stored. Subsequently, data synchronization may be maintained between the target device and the host server over the wireless communication network for the user data. Preferably, an encryption/decryption key for the user data is maintained in memory of the source and the target devices but not in the removable memory card. The user data is decrypted in accordance with the encryption/decryption key prior to storing it in memory of the target device. Advantageously, most if not all of the account switching steps may be facilitated by the end user "on-the-fly" without third-party involvement.

Figure 1:
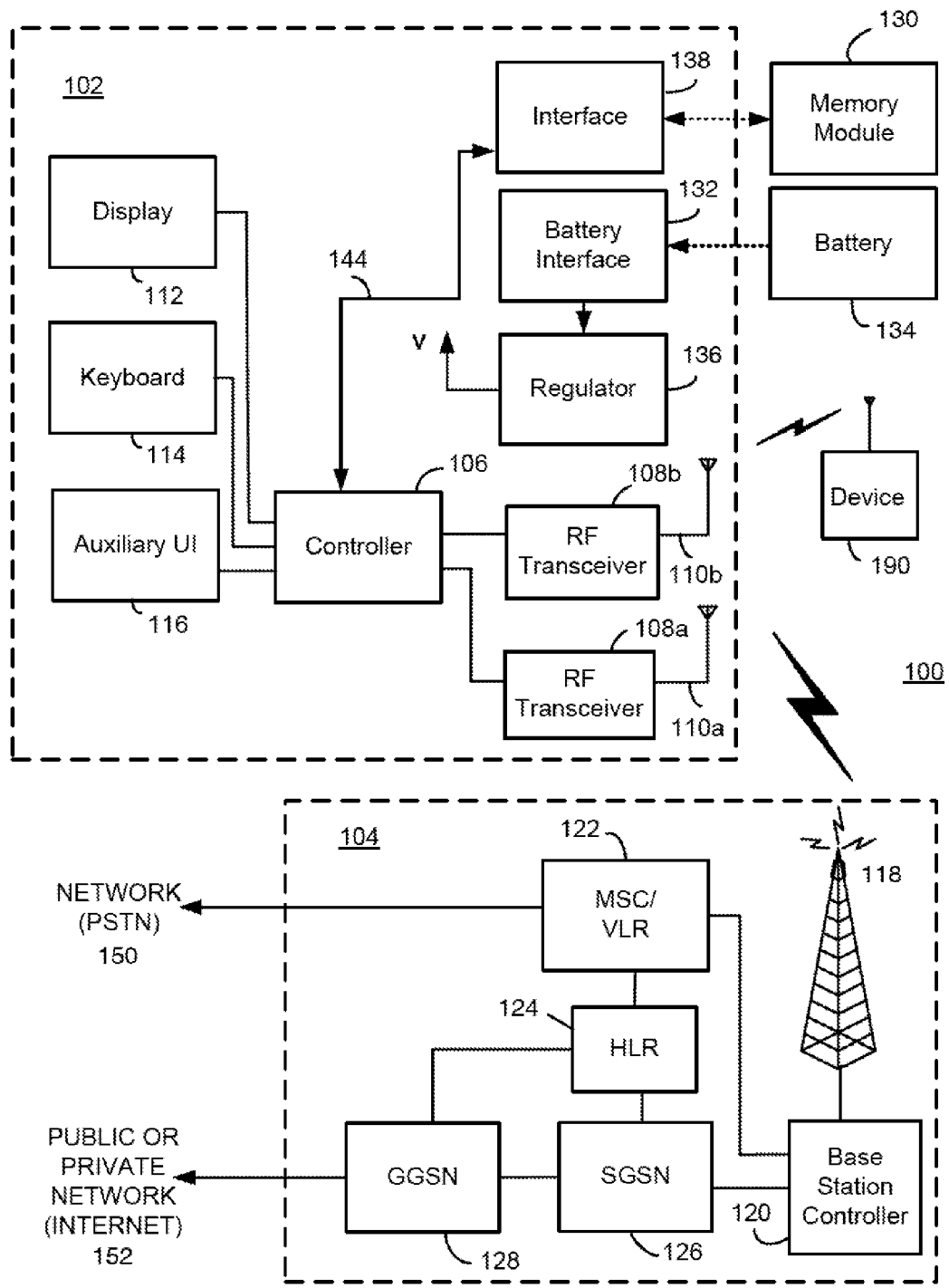
FIG. 1 is a block diagram which illustrates pertinent components of a communication system which includes a wireless communication network (such as a cellular telecommunications network) and a mobile communication device (such as a mobile station)

To illustrate one exemplary environment, FIG. 1 is a block diagram of a communication system 100 which includes a mobile station 102 (one type of mobile communication device). Mobile station 102 is adapted to communicate with a wireless communication network 104 which may be a cellular telecommunications network. For wireless communication with wireless network 104, mobile device 102 utilizes radio frequency (RF) transceiver circuitry 108a and an antenna 110a. Also as shown, mobile station 102 is adapted to communicate with a device 190 directly via short-range wireless communications. For wireless communication with device 190, mobile device 102 utilizes RF transceiver circuitry 108b and an antenna 110b for short-range communications.

RF transceiver 108b is a short-range wireless transceiver which may be operative in accordance with BLUETOOTH™ standards (BLUETOOTH™ Specification Version 2.0, Volumes 1 and 2), for example. BLUETOOTH™ is a registered trademark of Bluetooth SIG, Inc. Note that other types of short-range wireless transceivers may be utilized in lieu of BLUETOOTH™ types, such as WiFi (802.11) type wireless transceivers or WiMAX™ (802.16e) type wireless transceivers. WiMAX™ is a trademark of the WiMAX forum. Although shown in FIG. 1 as having separate and independent transceiver components, at least some portions or components of these otherwise different transceivers may be shared where possible.

Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108a and an antenna 110a. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108a. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110a. RF transceiver circuitry 108a performs functions similar to those of a tower station 118 and a base station controller (BSC) 120 (discussed later below), including for example modulation/demodulation and possibly encoding/decoding and encryption/decryption. It is also contemplated that RF transceiver circuitry 108a may perform certain functions in addition to those performed by BSC 120. It will be apparent to those skilled in art that RF transceiver circuitry 108a will be adapted to particular wireless network or networks in which mobile station 102 is intended to operate. When mobile station 102 is fully operational, an RF transmitter of RF transceiver circuitry 108a is typically keyed or turned on only when it is sending to network, and is otherwise turned off to conserve resources. Similarly, an RF receiver of RF transceiver circuitry 108a is typically periodically turned off to conserve power until it is needed to receive signals or information (if at all) during designated time periods.

To receive power, mobile station 102 includes a battery interface 132 for receiving one or more rechargeable batteries 134. Battery 134 provides electrical power to electrical circuitry in mobile station 102, and battery interface 132 provides for a mechanical and electrical connection for battery 134. Battery interface 132 is coupled to a regulator 136 which provides a regulated voltage to electrical components of mobile station 102.

Mobile station 102 also operates using a memory module 130, such as a Subscriber Identity Module (SIM), which is connected to or inserted in mobile station 102 at an interface 138. Memory module 130 is one type of a conventional "smart card" used to identify an end user (or subscriber) of mobile station 102 and to personalize the device, among other things. With memory module 130, the mobile station terminal is operational for communication through this particular wireless network 104. By inserting memory module 130 into mobile station 102, an end user can have access to any and all of his/her subscribed services. Memory module 130 generally includes a processor and memory for storing information. Since memory module 130 is coupled to interface 138, it is coupled to controller 106 through communication lines 144. In order to identify the subscriber, memory module 130 contains some user parameters such as an International Mobile Subscriber Identity (IMSI). An advantage of using memory module 130 is that end users are not necessarily bound by any single physical mobile station. Memory module 130 may store additional user information for the mobile station as well, including datebook (or calendar) information and recent call information. Note that memory module 130 may not be a SIM but alternatively may be a different type of a removable user identity module (e.g. a R-UIM), or alternatively may not be needed altogether depending on the network and device type.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108a and antenna 110a may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile station 102 may have a more particular implementation as described later in relation to mobile station 102 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an is associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 150. SGSN 126 is coupled to BSC 120 and to GGSN 128, which is in turn coupled to a public or private data network 152 (such as the Internet). HLR 124 is coupled to MSC 122, SGSN 126, and GGSN 128. Other types of cellular networks and cellular technologies may be employed as alternatives, as well as other types of wireless networks and technologies such as 802.11 type (WiFi) networks/technologies or 802.16e type (WiMAX) technologies.

Tower station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 124. In case of a voice call to mobile station 102, HLR 124 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 124 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and. makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
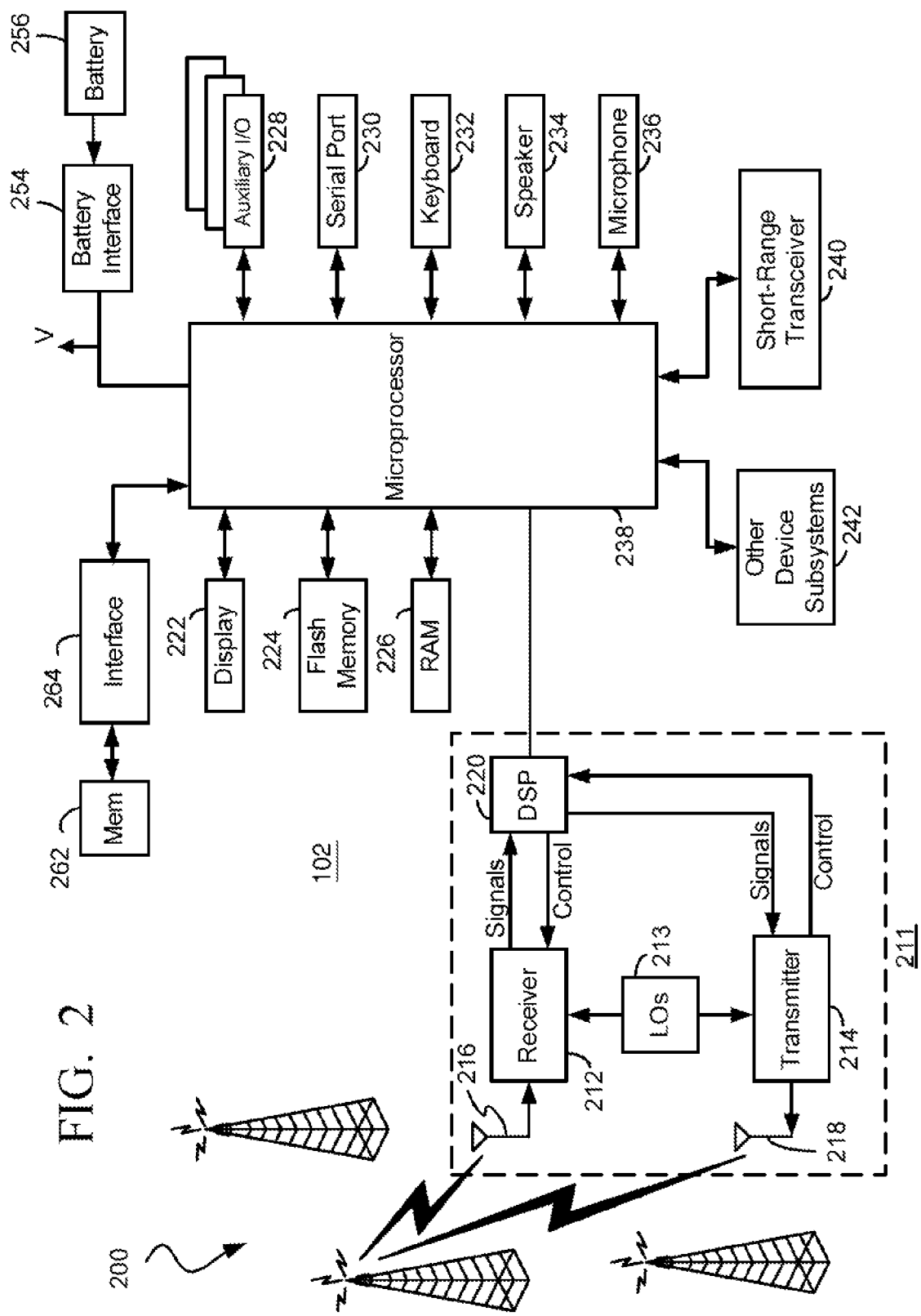
FIG. 2 is a more detailed diagram of a preferred mobile station of FIG. 1.

FIG. 2 is a detailed block diagram of a preferred mobile station 102 of the present disclosure. Mobile station 102 is preferably a two-way communication device having at least voice and advanced data communication capabilities, including the capability to communicate with other computer systems. Depending on the functionality provided by mobile station 102, it may be referred to as a data messaging device, a two-way pager, a cellular telephone with data messaging capabilities, a wireless Internet appliance, or a data communication device (with or without telephony capabilities). Mobile station 102 may communicate with any one of a plurality of fixed transceiver stations 200 within its geographic coverage area.

Mobile station 102 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in field of communications, particular design of communication subsystem 211 depends on the communication network in which mobile station 102 is intended to operate.

Mobile station 102 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 102, and therefore mobile station 102 requires a Subscriber Identity Module or "SIM" card 262 (indicated in FIG. 2 as "mem" to denote one type of memory module) to be inserted in a SIM interface 264 in order to operate in the network. SIM 262 includes those features described in relation to FIG. 1. Again, note that SIM 262 may alternatively be a different type of a removable user identity module (e.g. a R-UIM), or alternatively may not be needed altogether depending on the network and device type.

Mobile station 102 is a battery-powered device so it also includes a battery interface 254 for receiving one or more rechargeable batteries 256. Such a battery 256 provides electrical power to most if not all electrical circuitry in mobile station 102, and battery interface 254 provides for a mechanical and electrical connection for it. The battery interface 254 is coupled to a regulator (not shown) which provides a regulated voltage V to all of the circuitry.

Mobile station 102 includes a microprocessor 238 (which is one implementation of controller 106 of FIG. 1) which controls overall operation of mobile station 102. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 102. A predetermined set of applications which control basic device operations, including at least data and voice communication applications, as well as techniques of the present disclosure, will normally be installed on mobile station 102 during its manufacture. A preferred application that may be loaded onto mobile station 102 may be a personal information manager (PIM) application having the ability to organize and manage data items relating to user such as, but not limited to, e-mail, calendar events, voice mails, appointments, and task items. Naturally, one or more memory stores are available on mobile station 102 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 102 with respect to such items. This is especially advantageous where the host computer system is the mobile station user's office computer system. Additional applications may also be loaded onto mobile station 102 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 102 and may provide enhanced on-device functions, communication-related functions, or both. For example, secure communication applications may enable electronic commerce functions and other such financial transactions to be performed using mobile station 102.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 102 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 102 is substantially similar, except that the received signals would be output to speaker 234 and signals for transmission would be generated by microphone 236. Alternative voice or audio I/O subsystems, such as a voice message recording subsystem, may also be implemented on mobile station 102. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 102 by providing for information or software downloads to mobile station 102 other than through a wireless communication network. The alternate download path may, for example, be used to load an encryption key onto mobile station 102 through a direct and thus reliable and trusted connection to thereby provide secure device communication.

Short-range wireless transceiver 240 of FIG. 2 is an additional component which provides for short-range wireless communication between mobile station 102 and different systems or devices. Preferably, short-range wireless transceiver 240 is operative in accordance with BLUETOOTH™ standards (BLUETOOTH™ Specification Version 2.0, Volumes 1 and 2), for example. The communication protocol utilized may be any suitable protocol, such as OBEX (OBject EXchange) which is designed for swapping binary objects between particular devices. An OBEX is designed to function like http, as it allows the device to connect to a server in much the same way. Once connected to a server, the device can either make a request or provide objects to OBEX. Note that other types of short-range wireless transceivers may be utilized in lieu of BLUETOOTH™ types, such as WiFi (802.11) type wireless transceivers or WiMAX™ (802.16e) type wireless transceivers.

Figure 3:
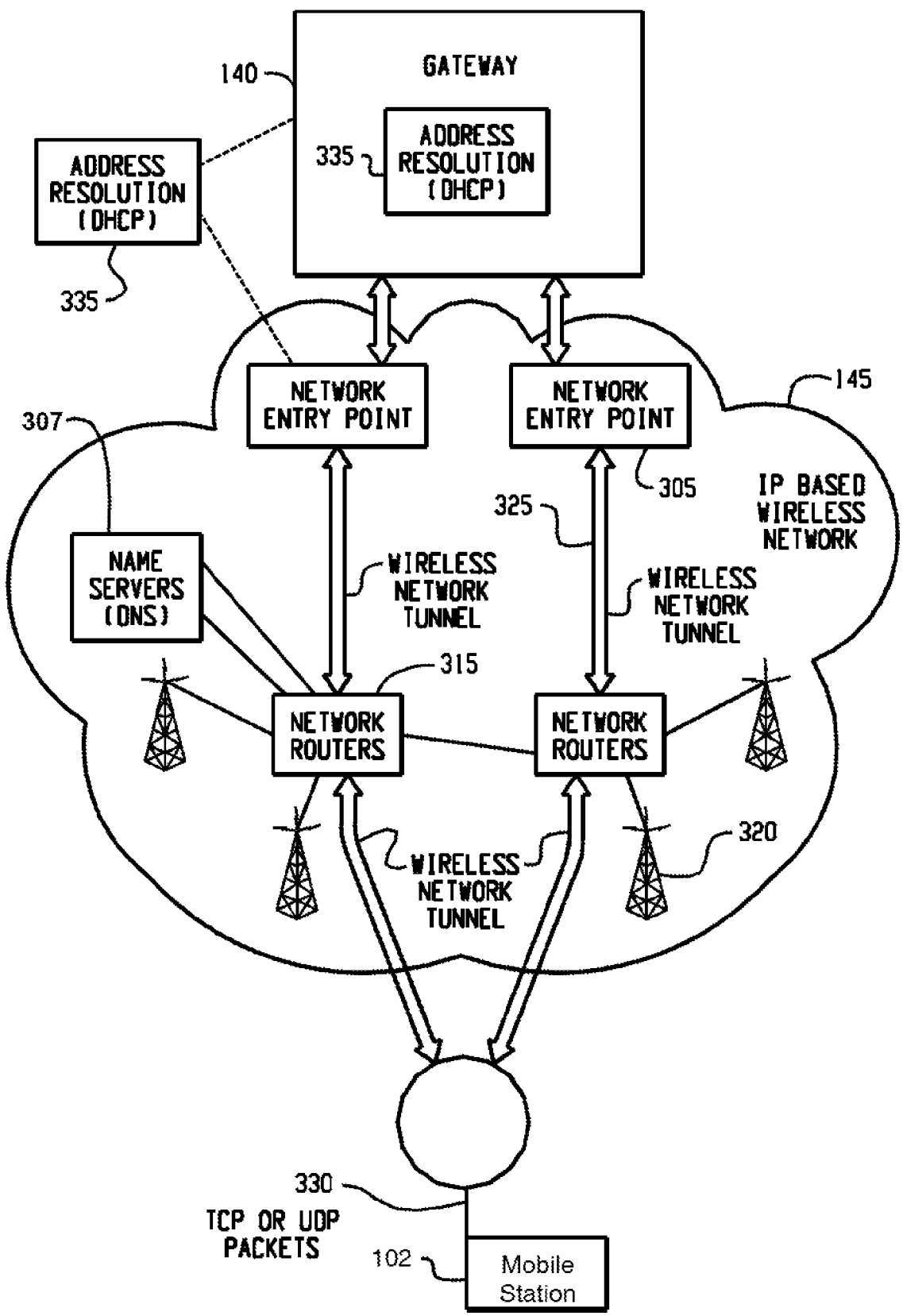
FIG. 3 is a system structure which helps provide data-synchronized communications for the mobile communication device in the wireless communication network of FIGS. 1 and 2, where the mobile communication device is operative to maintain data synchronization with a host server over the wireless communication network for user data of an application program (e.g. an e-mail application program) associated with the user account.

FIG. 3 shows a system structure which helps provide data communication services for a mobile communication device via a wireless communication network. In particular, FIG. 3 shows basic components of an IP-based wireless data network which may be utilized for facilitating data-synchronized communications. Mobile station 102 communicates via a wireless packet data network 145 and may also be capable of communicating via a wireless voice network (not shown). According to the present disclosure, mobile station 102 is operative to maintain data synchronization with a host server (present via a gateway 140) over wireless packet data network 145 for user data of an application program associated with a user account.

As shown in FIG. 3, gateway 140 may be coupled to an internal or external address resolution component 335 and one or more network entry points 305. Data packets are transmitted from gateway 140, which is source of information to be transmitted to mobile station 102 (e.g. the host server), through wireless packet data network 145 by setting up a wireless network tunnel 325 from gateway 140 to mobile station 102. In order to create this wireless tunnel 325, a unique network address is associated with mobile station 102. In an IP-based wireless network, however, network addresses are typically not permanently assigned to a particular mobile station 102 but instead are dynamically allocated on an as-needed basis. It is thus preferable for mobile station 102 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless packet data network 145 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 102.

Wireless network tunnels such as a wireless tunnel 325 are opened across wireless packet data network 145 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 102 must use a specific technique associated with wireless packet data network 145. The step of opening such a wireless tunnel 325 may require mobile station 102 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 102 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 102. When an IP address has been allocated to mobile station 102 and communicated to gateway 140, information can then be forwarded from gateway 140 to mobile station 102.

Figure 4:
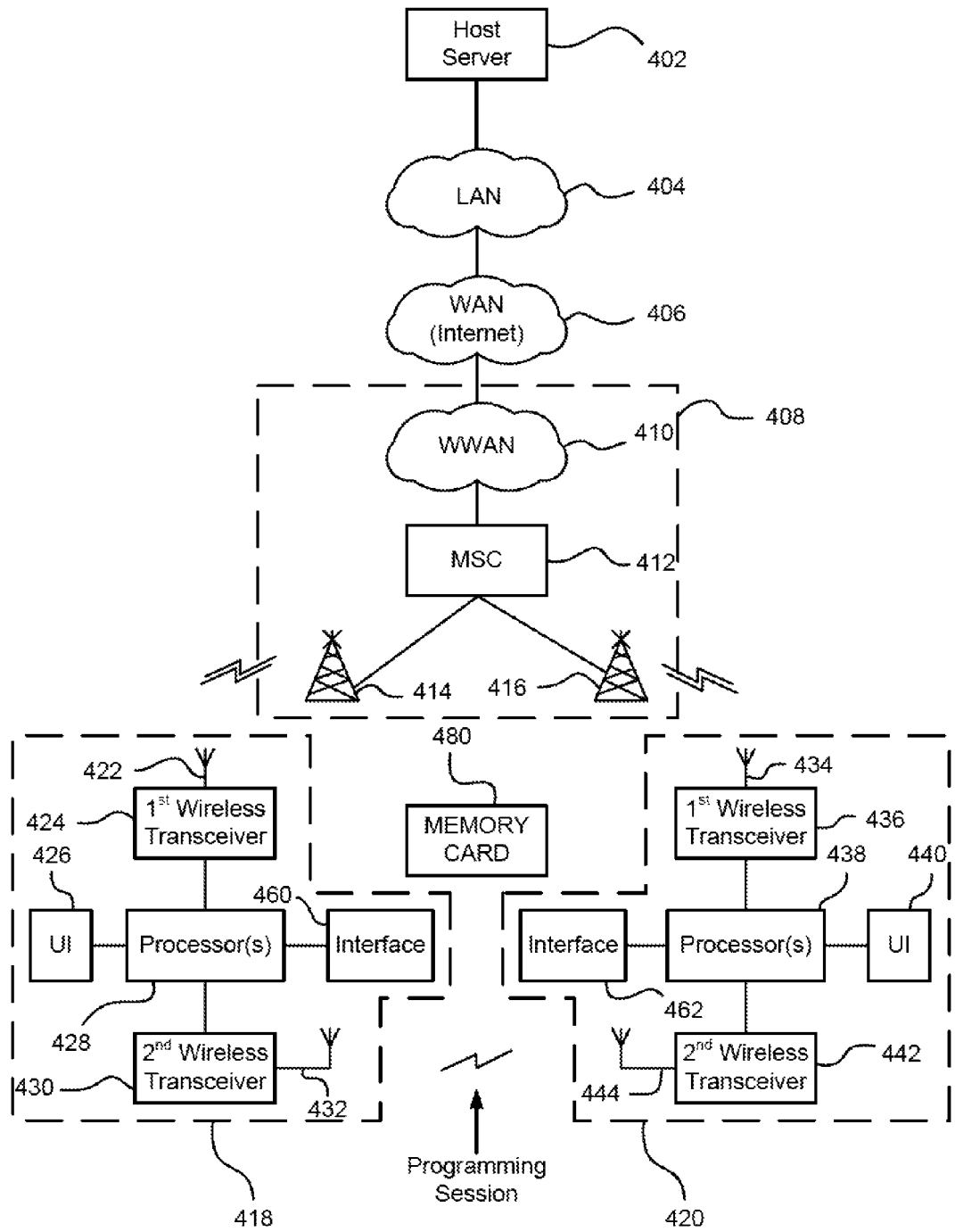
FIG. 4 is another depiction of components of the communication system of FIGS. 1-3, where the mobile communication device is further operative to engage in a programming session through a short-range transceiver with another mobile communication device for switching communications associated with the user account.

FIG. 4 is a more generalized view of pertinent components in the communication system of FIGS. 1-3, which illustrates that the mobile station is further operative to engage in a programming session via a short-range transceiver with another mobile communication device to assist in the switching of communications associated with the user account. In FIG. 4, the system is shown to include a host server 402, a local area network 404 (e.g. a private communication network of an enterprise or corporation), a wide area network 406 such as the Internet, a wireless communication network 408 (e.g. a cellular telecommunications network or wireless packet data network), and a first ("source") mobile communication device 418 and a second ("target") mobile communication device 420.

Wireless communication network 408 includes a mobile switching center (MSC) 412 and a plurality of base stations such as base stations 414 and 416 (e.g. see earlier discussion in relation to FIG. 1). Source device 418 includes one or more processors 428, a user interface 426 coupled to the one or more processors 428, a first wireless transceiver 424 and antenna means 422 for communicating through base stations 414 and 416 of the wireless communication network 408, and a second wireless transceiver 430 and antenna means 432. Similarly, target device 420 includes one or more processors 438, a user interface 440 coupled to the one or more processors 438, a first wireless transceiver 436 and antenna means 434 for communicating through base stations 414 and 416 of wireless communication network 408, and a second wireless transceiver 442 and antenna means 444.

Host server 402 is operative to maintain data synchronization with such mobile communication devices 418 and 420 (i.e. one at a time) over wireless communication network 408 (also via LAN 404 and WAN 406) for user data of an application program associated with a user account. The application program may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. For the data-synchronized communications, host server 402 maintains storage of a mapping of a user account name or identifier of the user account with a personal identification number of the mobile communication device. When communications are required with the mobile communication device, the personal identification number is used to route the messages to/from the source device through the system.

Second wireless transceivers 430 and 442 of source and target devices 418 and 420 are short-range wireless transceivers through which a programming session may be established and maintained for assisting in switching communications associated with the user account. During the programming session, user account data associated with the user account (e.g. at least one encryption/decryption key for data-synchronized communication with host server 402) may be transmitted from source device 418 to target device 420 and programmed in memory of target device 420. In addition, the user data associated with the application program. These techniques and related techniques are described in relation to the follow flowcharts of FIGS. 5-9.

Preferably, these short-range wireless transceivers 430 and 442 of source and target devices 418 and 420 are operative in accordance with BLUETOOTH™ standards. For example, the BLUETOOTH™ standards may be based on BLUETOOTH™ Specification Version 2.0, Volumes 1 and 2. The communication protocol utilized may be any suitable protocol, such as OBEX (OBject EXchange) which is designed for swapping binary objects between particular devices. An OBEX is designed to function like http, as it allows the device to connect to a server in much the same way. Once connected to a server, the device can either make a request or provide objects to OBEX. Note that other types of short-range wireless transceivers may be utilized in lieu of BLUETOOTH™ types, such as WiFi (802.11) type wireless transceivers or WiMAX™ (802.16e) type wireless transceivers.

Source and target devices 418 and 420 may additionally include memory card interfaces 460 and 462, respectively, which are adapted to receive a removable memory card 480. In the present embodiment, removable memory card is a Secure Digital (SD) memory card. The SD memory card may be configured in accordance with SD card specification 1.01 or specification 1.1, as examples. Equipped with such interfaces 460 and 462, source and target devices 418 and 420 may be adapted to transfer user data associated with the user account via removable memory card 480 as described later in relation to FIGS. 8-9, in lieu of the user data being transferred via wireless transceivers 430 and 442 in the programming session between source and target devices 418 and 420.

Figure 5A:
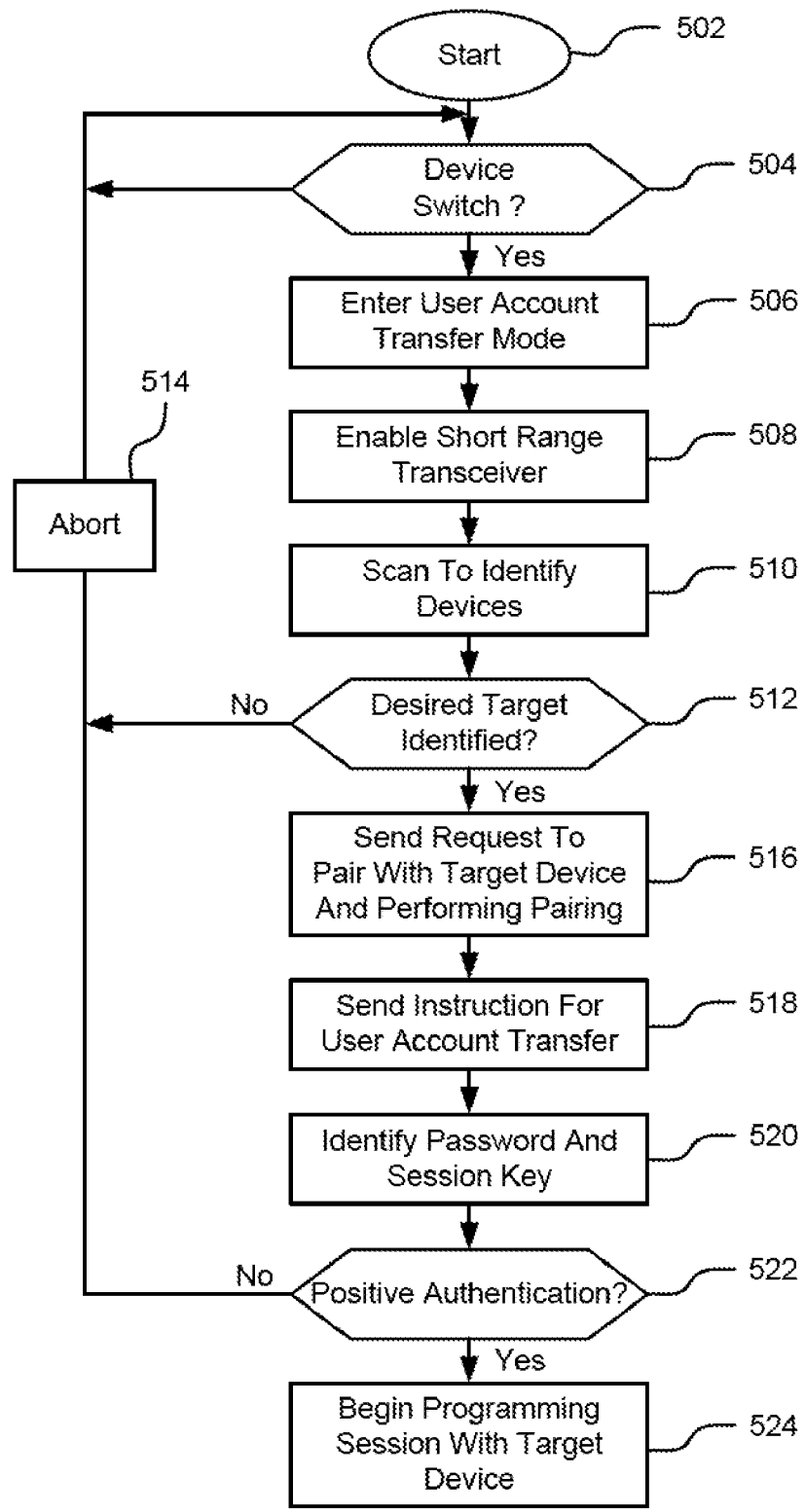
FIGS. 5A and 5B form a flowchart which describes a method for use in switching communications associated with the user account from a first ("source") mobile communication device to a second ("target") mobile communication device, where the method is performed by the source device.
Figure 5B:
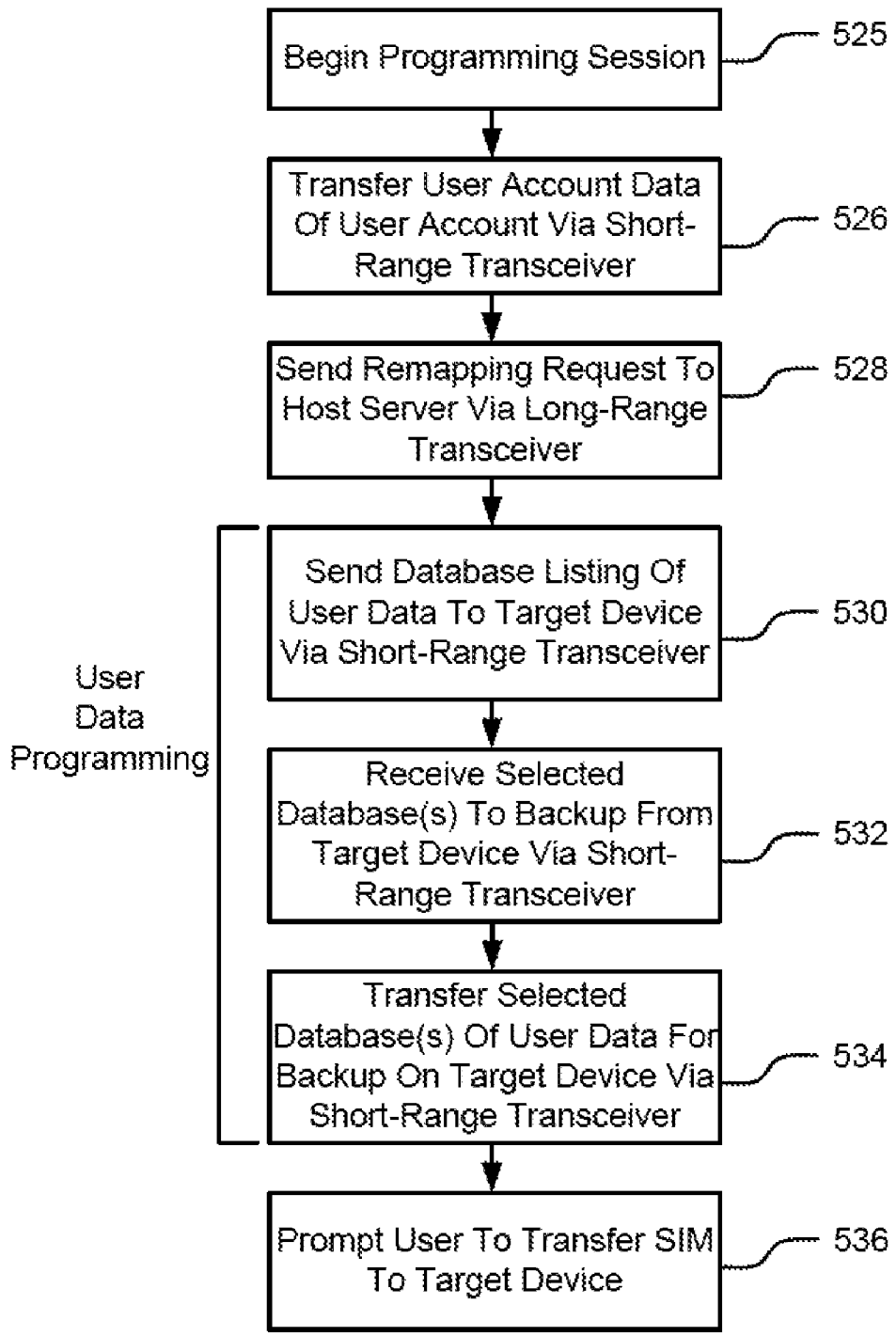

FIGS. 5A-5B form a flowchart which describes a method for use in switching communications associated with a user account from a "source" mobile communication device to a "target" mobile communication device. The techniques may be employed and/or utilized by the devices and components described earlier in relation to FIGS. 1-4. In particular, the method of FIGS. 5A-5B is performed by the source device to enable the target device for communications associated with the user account. The source and target devices may be possessed or owned by the same end user. The techniques described in relation to the flowchart may be performed by one or more processors of the source device. A computer program product which may embody the technique may include a computer readable medium having computer instructions stored therein which are executable by the one or more processors for performing the technique.

Initially, the source device is enabled to maintain data synchronization with a host server over a wireless communication network via a wireless transceiver for user data of an application program associated with the user account. The application program of the host server and the source and target devices may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. For the data-synchronized communications, the host server maintains storage of a mapping of a user account name or identifier of the user account with a personal identification number of the source device. When communications are required with the source device, the personal identification number is used to route the messages to/from the source device through the system.

Beginning at a start block 502 of FIG. 5A, the processor of the source device identifies whether a request for switching communications associated with a user account to the target device is received from the end user via its user interface (step

504 of FIG. 5A). If not, the processor continues monitoring for such request. When such request is received as identified at step 504, then the source device enters into a user account transfer mode (step 506 of FIG. 5A). For this mode of operation, the processor may cause a prompt to be displayed in the visual display which instructs the end user to locate the target device within coverage range of the source device. The processor further causes its short-range wireless transceiver to be enabled if previously disabled (step 508 of FIG. 5A). Once the transceiver is stabilized, the processor utilizes the short-range wireless transceiver to scan to identify one or more devices within its coverage region (step 510 of FIG. 5A).

The processor causes a list of one or more identifiers corresponding to the one or more identified devices from the scanning operation to be displayed in its visual display. The list of identifiers is displayed with a prompt for the end user to select one of the devices for pairing. An identifier corresponding to the target device of the end user will be displayed in this list, assuming that that target device is located nearby as it should be. If the target device is identified by the end user in the visual display and selected via the user interface (step 512 of FIG. 5A), the processor detects this selection and sends a request via the short-range wireless transceiver to pair with the target device corresponding to the selection for communications (step 516 of FIG. 5A). The target device receives this request through its short-range wireless transceiver and responds appropriately to cause the communications pairing to occur, assuming that conditions are suitable. If the target device is not identified in step 512, the process may be aborted (step 514 of FIG. 5A).

Preferably, the pairing process of step 516 requires a passkey exchange and validation for authentication, as well as to provide a secure wireless connection. In one conventional approach, a passkey is generated from a password or passphrase entered by the end user of the source device and is transmitted to the target device for comparison of its own calculation. Another passkey is then transmitted from the target device to the source device to perform a symmetrical comparison. Each passkey is generated based on the passphrase entered by the end user as well as a randomly-generated number, so that both passkeys and the random numbers are exchanged before the comparison. The passphrase is always an out-of-band secret, which is manually-entered and never transmitted over-the-air, which helps prevent a "man-in-the-middle" attack. Depending on the type of connection and security family utilized, another suitable alternative cryptosystem may be utilized. If there is an error in the pairing process (e.g. if the passkeys fail to match), then the process may be aborted in step 514 of FIG. 5A. In an alternative embodiment, no passkey exchange and validation is performed for the device pairing.

Next after step 516, the processor causes an instruction to operate in the user account transfer mode to be sent to the target device via the short-range wireless transceiver (step 518 of FIG. 5A). This instruction does indeed cause the target device to be engaged in the user account transfer mode. For use in the upcoming programming session, the processor of the source device produces or identifies a session key (step 520 of FIG. 5A). The session key may be produced or derived from information stored in memory, such as unique information associated with the end user or device, even including a prestored password. Alternatively, or more specifically, the session key may be produced or derived based on a password which is generated (e.g. randomly) by the processor of the source device or entered in by the end user via the user interface of the source device via a visual prompt. In this latter case, the processor causes a prompt to be produced in the visual display which instructs the end user to enter the same password in at the user interface of the target device. In response, the end user of the source device acts on this information and physically retrieves the target device, entering the password in at the user interface of the target device. After the password is entered in at the target device, the processor of the source device receives information from the target device (i.e. entered password or session key) via its short-range wireless transceiver. The source device then performs an authentication based on the received information (step 522 of FIG. 5A). If the processor of the source device properly authenticates the source device based on the information, such as the password or session key (e.g. the received session key matches the session key as compared at the source device) (step 522 of FIG. 5A), then the processor of the source device proceeds to cause a programming session to be started with the target device (step 524 of FIG. 5A). This session will be described from the perspective of the source device in the next flowchart in FIG. 5B. If there is no positive authentication at step 522, the process is aborted at step 514. In an alternative embodiment, no password/session key exchange and validation is performed (i.e. steps 520 and 522 are omitted).

Continuing at block 524 of FIG. 5B to begin the programming session, the processor of the source device causes user account data of the user account to be transmitted via the short-range wireless transceiver to the target device (step 526 of FIG. 5B). In the present embodiment, the user data of the programming session is encrypted by the processor based on the session key and the encrypted user data is transmitted via the short-range wireless transceiver. Alternatively, the user data of the programming session is encrypted by the processor based on the passkey (not the session key). Further alternatively, the user data of the programming session may be encrypted by the processor based on both the passkey and the session key. Note that the passkey has a first length and the session key has a second length that is greater than the first length, so that the when the session key is utilized, much better security is provided during the programming session.

The user account data may be or include various information which facilitates communications associated with the user account. In the present embodiment, one pertinent item of user account data is an encryption/decryption key required for use with data synchronization communications with the host server. Other user account data or related data that may be transferred may be or include one or more user account identifiers (e.g. one or more e-mail addresses of the user account), one or more passwords and/or password information associated with the user account, routing data for accessing one or more services (e.g. IP addresses of host servers), and security and/or restriction data of an IT policy or the like (e.g. an indication of whether a password is required, a length of that password, etc.). The user account data is stored and programmed in the target device for later use.

Next, the processor causes a remapping request to be sent to the host server through the wireless network (step 528 of FIG. 5B). The remapping request is for use in remapping the user account name or identifier of the user account from the personal identification number of the source device to the personal identification number of the target device. The host server receives this remapping request and causes the remapping to occur by manipulating the stored data so that the user account name or identifier is mapped to the personal identification number of the target device which then has current active status. Note that only a single mobile device may have current active status at any given time. The user account name or identifier may be or include, for example, an e-mail address of the user account.

The remapping may be performed without deleting the personal identification number of the source device (or associated mapping) from the memory at the host server, as it may be used later for a subsequent remapping request by the target device to switch back to use of the source device for the user account. In this case, the host server maintains storage of the personal identification number of both the source and the target device, along with an associated indication of which device has the current active status. Note that the host server may have three or more personal identification numbers corresponding to three or more mobile devices stored in memory in association with the user account, so that one of the three or more mobile devices may be selected for communications associated with the user account at any give time.

In the present embodiment, the remapping request received by the host server from the source device includes the personal identification number of the target device, which is used by the host server for the remapping. The personal identification number of the target device may be obtained by the source device from the target device in the programming session, or alternatively may be manually entered via the user interface of the source device by the end user.

In a variation of the techniques described in relation to step 528, the remapping request may be alternatively made by the target device to the host server over the wireless communication network via its wireless transceiver. Preferably, the processor of the target device permits such remapping request by the end user only if the target device had been utilized previously in a user account switch with the source device (e.g. based on an indication or flag stored in its memory), and/or the host server permits the remapping request from the target device only if the target device had been previously utilized in a user account switch with the source device (e.g. based on the personal identification number of the target device stored in association with the personal identification number of the source device). Note that, if the remapping request is received by the host server from the target device, then the target device already has its personal identification number stored in its memory and no special procedure need be taken to obtain it for submission along with the remapping request to the host server. However, the target device may need to submit the personal identification number of the source device in such request, which it may receive in a manner similar to that described for the source device.

Next, the source device proceeds through steps 530-534 of FIG. 5B for the transfer of the user data associated with the user account to the target device through the short-range wireless transceiver. This procedure is performed in a manner which provides the end user some flexibility or options to select which set(s) of user data are transferred and programmed. The procedure in steps 530-534 is one way in which the target device may receive the user data; for example, the source device may alternatively receive the user data via a removable memory card (e.g. a Secure Digital or SD card) from the source device as described later in relation to FIGS. 8-9). Another way for the source device to receive the user data is through data synchronization with the host server once it is activated, which would take longer to perform.

With respect to the procedure in steps 530-534 of FIG. 5B, the processor of the source device identifies from its memory which databases of user data are available for transfer, and sends a database list of database identifiers corresponding to the same to the target device via the short-range wireless transceiver (step 530 of FIG. 5B). At the target device, the end user receives the list of database identifiers in the visual display for end user selection of one or more of the databases of the source device to transfer. The processor then receives the selected database identifier(s) corresponding to the database(s) of user data to backup through the short-range wireless transceiver (step 532 of FIG. 5B). In response, the processor causes the database(s) of the user data corresponding to the selected database identifier(s) to be transmitted to the target device for backup via its short-range wireless transceiver (step 534 of FIG. 5B). At the target device, these database(s) are received, stored and programmed in memory. Thus, the user data associated with the user account is transferred from the source device to the target device over-the-air via the short-range wireless transceiver. The processor then causes a prompt to be displayed in the visual display of the mobile device which prompts the end user to transfer the SIM card to the target device (step 536 of FIG. 5B). Depending on the approach taken, this step may or may not be needed.

When the procedure is completed, the target device is thereby enabled to maintain data synchronization with the host server over the wireless communication network via its wireless transceiver for the user data of the application program associated with the user account. For the new data-synchronized communications, the host server now maintains storage of a mapping of the user account name or identifier of the user account with the personal identification number of the target device. When communications are required with the target device, the personal identification number is used to route the messages to/from the target device through the system. The data-synchronized communications are made secure with use of the encryption/decryption key received during the programming session, where user data being transmitted from the target device are encrypted and user data being received at the target device are decrypted. The source device is no longer enabled to maintain the data synchronization with the host server, unless and until the communications associated with the user account are switched back to the source device.

Although the source device is no longer enabled to maintain the data synchronization with the host server, the communications associated with the user account may be switched back to the source device with use of a subsequent remapping request. In this scenario, the target device actually becomes the new source device, and the source device becomes the new target device. The end user of the new source device causes a remapping request to be sent to the host server over the wireless communication network, so that the new target device may be enabled for the communications. This will be described in more detail later in relation to FIG. 7. The programming session between the source and target devices need not take place again since, after the initial programming session between the source device and the target device, both devices have all of the information necessary (which is maintained by each device regardless of its status) to be re-enabled for the data-synchronized communications associated with the user account.

Figure 6A:
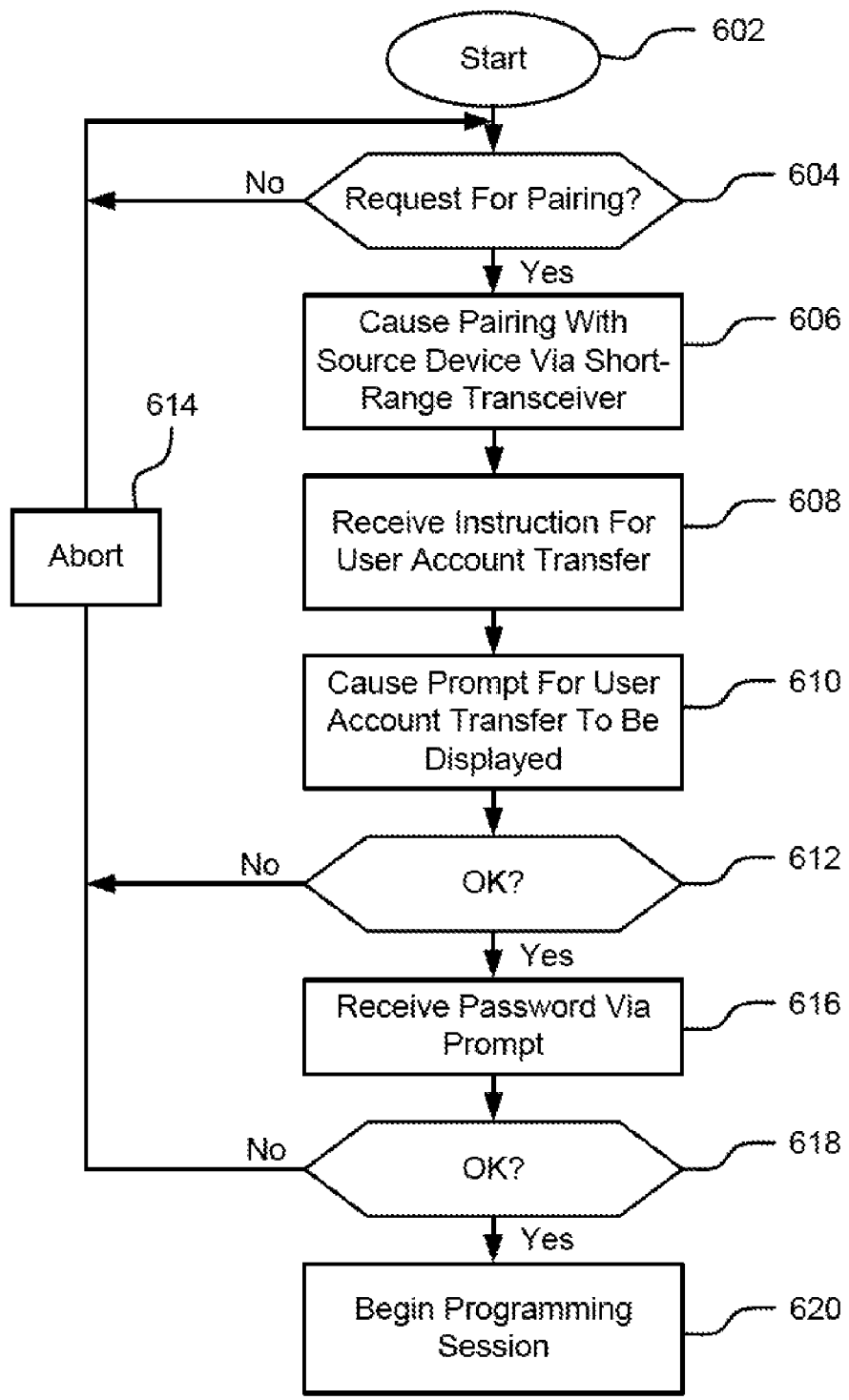
FIGS. 6A and 6B form a flowchart which describes another method for use in switching communications associated with the user account from the source device to the target device, where the method is performed by the target device.
Figure 6B:
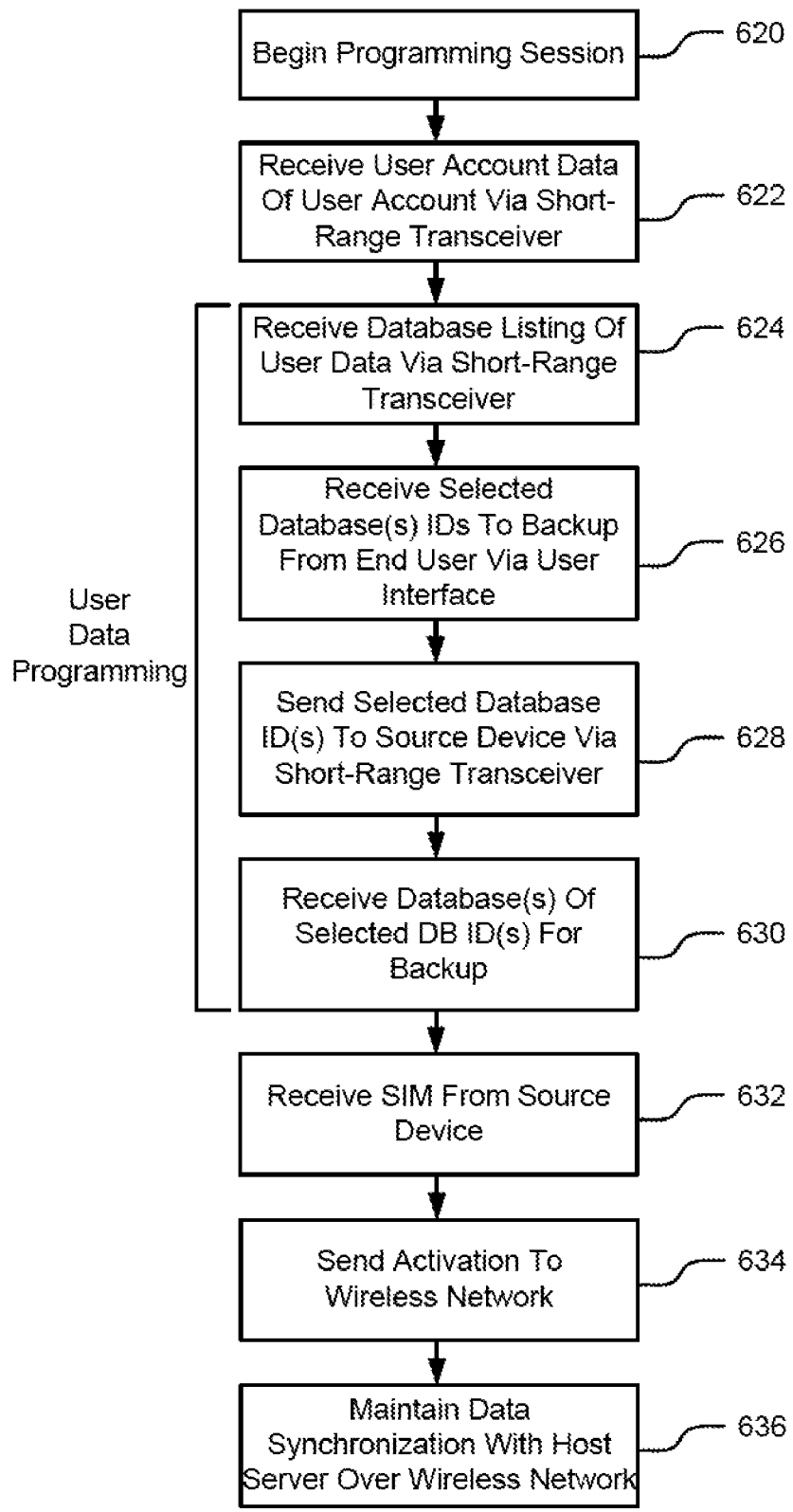

FIGS. 6A-6B form a flowchart related to the flowchart of FIGS. 5A-5B, which describes another method for use in switching communications associated with the user account from the "source" mobile communication device to the "target" mobile communication device. The techniques may be employed and/or utilized by the devices and components described earlier in relation to FIGS. 1-4. In particular, the method of FIGS. 6A-6B is performed by the target device to enable it for communications associated with the user account. The source and target devices may be possessed or owned by the same end user. The techniques described in relation to the flowchart may be performed by one or more processors of the target device. A computer program product which may embody the technique may include a computer readable medium having computer instructions stored therein which are executable by the one or more processors for performing the technique.

Initially, the source device is enabled to maintain data synchronization with the host server over the wireless communication network via the wireless transceiver for user data of the application program associated with the user account. The application program may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. For the data-synchronized communications, the host server maintains storage of a mapping of the user account name or identifier of the user account with the personal identification number of the source device. When communications are required with the source device, the personal identification number is used to route the messages to/from the source device through the system.

Beginning at a start block 602 of FIG. 6A, the processor of the target device has its short-range wireless transceiver enabled and identifies whether a request to be paired with the source device is received through it (step 604 of FIG. 6A). If such request is not received in step 604, the target device continues such monitoring. If such request is received by the target device in step 604, the processor performs operations to cause the target device to be paired with the source device (step 606 of FIG. 6A). Next, the processor receives an instruction from the source device via the short-range wireless transceiver to operate in a user account transfer mode (step 608 of FIG. 6A). If accepted by the target device (e.g. automatically or by end user selection via the user interface) (step 612 of FIG. 6A), this instruction does indeed cause the target device to be engaged in the user account transfer mode. If the user account transfer mode is not desired as identified in step 612, then the process is aborted in step 614.

For use in the upcoming programming session, the processor of the target device utilizes a session key. The session key may be produced or derived from information stored in memory, such as unique information associated with the end user or device, even including a prestored password. Alternatively, or more specifically, the session key may be produced or derived based on a password which is generated (e.g. randomly) by the processor of the source device, or produced or derived based on a password entered in by the end user via the user interface of the source device via a visual prompt. In this latter scenario, the processor of the target device causes a prompt to be produced in the visual display which instructs the end user to enter the password in at the user interface of the target device (step 616 of FIG. 6A). In response, the end user enters the password in at the user interface of the target device. After the password is entered in at the target device, the processor of the target device transmits information to the source device (i.e. entered password or session key) via its short-range wireless transceiver. The source device then performs an authentication based on the received information. If the processor of the source device properly authenticates the target device based on the information, such as the password or session key (e.g. the received session key matches the session key as compared at the source device) (as identified at step 618 of FIG. 6A), then the processor of the target device proceeds to cause a programming session to be started with the source device (step 620 of FIG. 6A). This session will be described from the perspective of the source device in the next flowchart in FIG. 6B. In an alternative embodiment, no authentication is performed (i.e. steps 616 and 618 are omitted). This session will be described from the perspective of the target device in the next flowchart in FIG. 6B. If there is no positive authentication at step 618, the process is aborted at step 614.

Continuing at block 620 of FIG. 6B to begin the programming session, the processor of the target device receives user account data of the user account via the short-range wireless transceiver from the source device (step 622 of FIG. 6B). In the present embodiment, the user data of the programming session is encrypted by the source device based on the session key, and the encrypted user data is received through the short-range wireless transceiver of the target device. The processor of the target device is operative to decrypt the encrypted user data based on the session key. Alternatively, the user data of the programming session is encrypted by the processor based on the passkey (not the session key). Further alternatively, the user data of the programming session may be encrypted by the processor based on both the passkey and the session key. Note that the passkey has a first length and the session key has a second length that is greater than the first length, so that the when the session key is utilized, much better security is provided during the programming session.

The user account data may be or include various information which facilitates communications associated with the user account. In the present embodiment, one pertinent item of user account data is an encryption/decryption key required for use with data synchronization communications with the host server. Other user account data or related data that may be transferred may be or include one or more user account identifiers (e.g. one or more e-mail addresses of the user account), one or more passwords and/or password information associated with the user account, routing data for accessing one or more services (e.g. IP addresses of host servers), and security and/or restriction data of an IT policy or the like (e.g. an indication of whether a password is required, a length of that password, etc.). The user account data is stored and programmed in the target device for later use.

At this time, the source device causes a remapping request to be sent to the host server through the wireless network. The remapping request is for use in remapping the user account name or identifier of the user account from the personal identification number of the source device to the personal identification number of the target device. The host server receives this remapping request and causes the remapping to occur by manipulating the stored data so that the user account name or identifier is mapped to the personal identification number of the target device which then has current active status. Note that only a single mobile device may have current active status at any given time. The user account name or identifier may be or include, for example, an e-mail address of the user account.

Note that the remapping may be performed without deleting the personal identification number of the source device from the memory at the host server, as it may be used later for a subsequent remapping request by the target device to switch back to use of the source device for the user account. In this case, the host server maintains storage of the personal identification number of both the source and the target device, along with an associated indication of which device has the current active status. Note that the host server may have three or more personal identification numbers corresponding to three or more mobile devices stored in memory in association with the user account, so that one of the three or more mobile devices may be selected for communications associated with the user account at any given time. In the present embodiment, the remapping request received by the host server from the source device includes the personal identification number of the target device, which is used by the host server for the remapping. The personal identification number of the target device may be obtained by the source device from the target device in the programming session, or alternatively may be manually entered via the user interface of the source device by the end user.

In a variation of the techniques described above, the remapping request may alternatively be made by the target device to the host server over the wireless communication network via its wireless transceiver. Preferably, the processor of the target device permits such remapping request by the end user only if the target device had been utilized previously in a user account switch with the source device (e.g. based on an indication or flag stored in its memory), and/or the host server permits the remapping request from the target device only if the target device had been previously utilized in a user account switch with the source device (e.g. based on the personal identification number of the target device stored in association with the user account and/or the personal identification number of the source device). Note that, if the remapping request is received by the host server from the target device, then the target device already has its personal identification number stored in its memory and no special procedure need be taken to obtain it for submission along with the remapping request to the host server. However, the target device may need to submit the personal identification number of the source device in such request, which it may receive in a manner similar to that described for the source device.

Next, the target device proceeds through steps 624-630 of FIG. 6B for the transfer of the user data associated with the user account from the source device through the short-range wireless transceiver. This procedure is performed in a manner which provides the end user some flexibility or options to select which set(s) of user data are transferred and programmed. The procedure in steps 624-630 is one way in which the target device may receive the user data; for example, the source device may alternatively receive the user data via a removable memory card (e.g. a Secure Digital or SD card) from the source device as described later in relation to FIGS. 8-9). Another way for the source device to receive the user data is through data synchronization with the host server once it is activated, which would take longer to perform.

With respect to steps 624-630 of FIG. 6B, the source device identifies from its memory which database(s) of user data are available for transfer. A database list of database identifier(s) corresponding to the same are received via the short-range wireless transceiver from the source device (step 624 of FIG. 6B). At the target device, the processor receives these database identifier(s) and causes them to be displayed in the visual display. The end user views the list of database identifier(s) in the visual display for end user selection of one or more of the database(s) from the source device to transfer and backup. The processor receives the selected database identifier(s) corresponding to the database(s) via the user interface (step 626 of FIG. 6B) and sends the selected database identifier(s) to the source device via the short-range wireless transceiver (step 628 of FIG. 6B).

In response, the database(s) of the user data corresponding to the selected database identifier(s) are received from the source device via the short-range wireless transceiver (step 630 of FIG. 6B). These database(s) are stored and programmed in memory. Thus, the user data associated with the user account is transferred from the source device to the target device over-the-air via the short-range wireless transceiver. Subsequently, the end user may retrieve the SIM from the source device and insert it in the SIM interface of the target device (step 632 of FIG. 6B). The processor of the target device may cause a prompt to be displayed in the visual display which prompts the end user to transfer the SIM card to the target device. Depending on the approach taken, the SIM card transfer may or may not be needed.

Next, the processor of the source device causes an activation request to be sent to the host server over the wireless communication network (step 634 of FIG. 6B). This activation request initiates a data synchronization between the target device and the host server. When the procedure is completed, the target device is thereby enabled to maintain data synchronization with the host server over the wireless communication network via its wireless transceiver for the user data of the application program associated with the user account (step 636 of FIG. 6B). For the new data-synchronized communications, the host server now maintains storage of a mapping of the user account name or identifier of the user account with the personal identification number of the target device. When communications are required with the target device, the personal identification number is used to route the messages to/from the target device through the system. Preferably, the data-synchronized communications are made secure with use of the encryption/decryption key received during the programming session, where user data being transmitted from the target device are encrypted and user data being received at the target device are decrypted. Once the target device is enabled, the source device is no longer enabled to maintain the data synchronization with the host server, unless and until the communications associated with the user account are switched back to the source device.

Although the source device is no longer enabled to maintain the data synchronization with the host server, the communications associated with the user account may be switched back to the source device with use of a subsequent remapping request. In this scenario, the target device actually becomes the new source device, and the source device becomes the new target device. The end user of the new source device causes a remapping request to be sent to the host server over the wireless communication network, so that the new target device may be enabled for the communications. This will be described below in relation to FIG. 7. The programming session between the source and target devices need not take place again since, after the initial programming session between the source device and the target device, both devices have all of the information necessary (which is maintained by each device regardless of its status) to be re-enabled for the data-synchronized communications associated with the user account.

Figure 7:
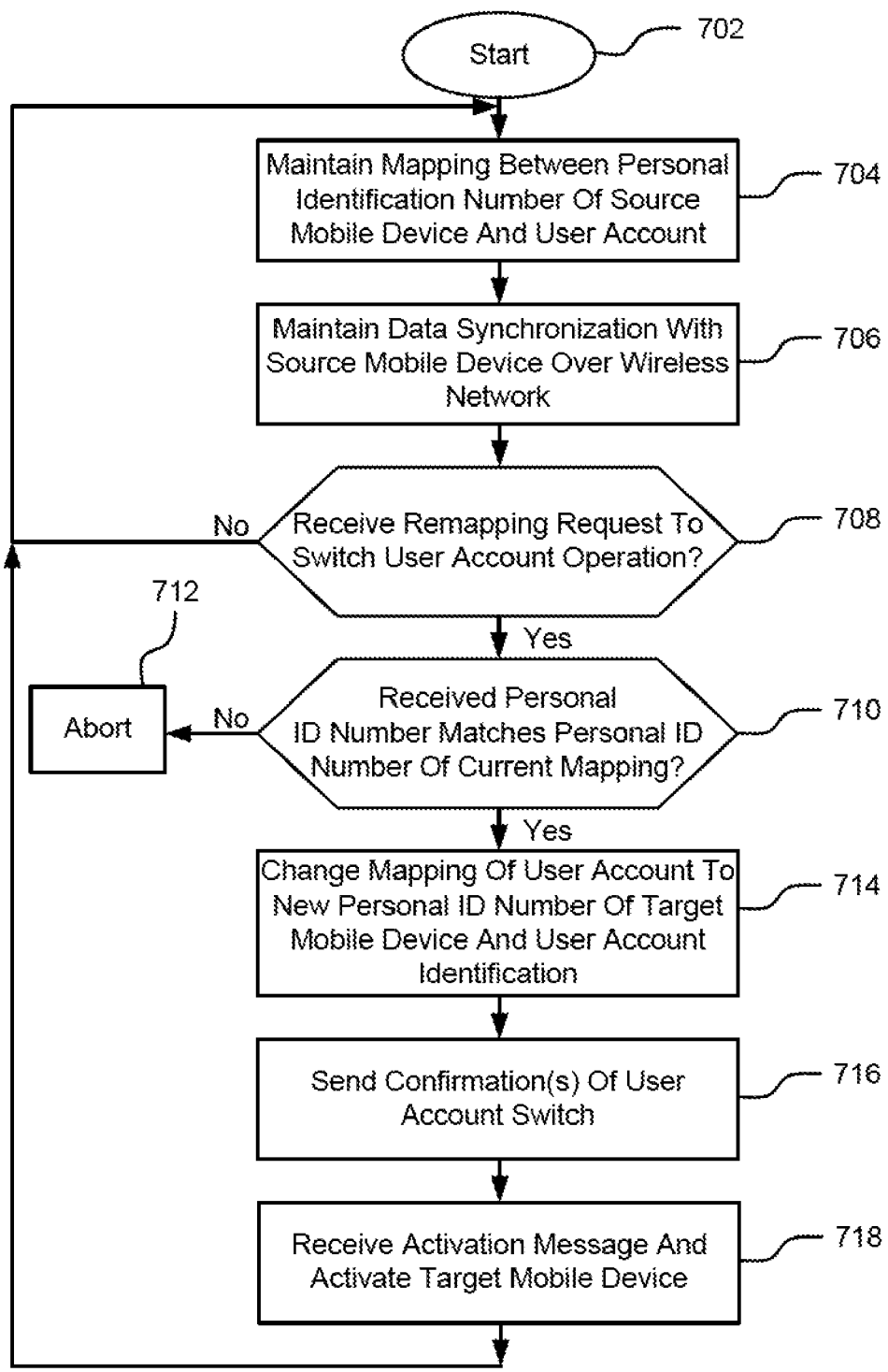
FIG. 7 is a flowchart which describes yet another method for use in switching communications associated with the user account from the source device to the target device, where the method is performed by the host server which maintains the data-synchronized communications with one of the devices.

FIG. 7 is a flowchart related to the flowcharts of FIGS. 5 and 6, which describe another method for use in switching communications associated with the user account from the "source" mobile communication device to the "target" mobile communication device. The techniques may be employed and/or utilized by the devices and components described earlier in relation to FIGS. 1-4. In particular, the method of FIG. 7 is performed by the host server to enable the target device for communications associated with the user account. The techniques described in relation to the flowchart may be performed by one or more processors of the host server. A computer program product which may embody the technique may include a computer readable medium having computer instructions stored therein which are executable by the one or more processors for performing the technique.

Beginning at a start block 702 of FIG. 7, the host server maintains storage of a mapping of a user account name or identifier of the user account with the personal identification number of the source device (step 704 of FIG. 7). With use of such mapping, the host server maintains data synchronization with the source device over the wireless communication network for user data of an application program associated with the user account (step 706 of FIG. 7). When communications are required with the source device, the personal identification number of the source device is used to route the messages to/from the source device through the system. The application program may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program.

During operation, the host server monitors whether any remapping request for switching communications associated with the user account is received via the wireless communication network (step 708 of FIG. 7). If no remapping request is received at step 708, then the host server continues monitoring for such messages and maintains data-synchronized communications with the source device. When a remapping request is received at step 708, the host server tests whether the message was sent from a mobile device having a personal identification number that matches that of the source device (or one that is stored in association with the user account) based on a comparison (step 710 of FIG. 7). If not, then the process is aborted (step 712 of FIG. 7). If the personal identification number matches that of the source device (or is one that is stored in association with the user account) at step 710, then processing for switching communications associated with the user account continues. In a variation of this procedure, the processor of the host server causes remapping to be performed in response to receiving a remapping request from the target device.

In response to the remapping request, the processor causes a change in the mapping of the user account to the personal identification number of the target device (step 714 of FIG. 7). The processor causes the remapping to occur by manipulating the stored data so that the user account name or identifier is mapped to the personal identification number of the target device which then has current active status. Note that only a single mobile device may have current active status at any given time. The user account name or identifier may be or include, for example, an e-mail address of the user account.

The remapping may be performed without deleting the personal identification number of the source device (or associated mapping) from the memory at the host server, as it may be used later for a subsequent remapping request by the target device to switch back to use of the source device for the user account. In this case, the host server maintains storage of the personal identification number of both the source and the target device, along with an associated indication of which device has the current active status. Note that the host server may have three or more personal identification numbers corresponding to three or more mobile devices stored in memory in association with the user account, so that one of the three or more mobile devices may be selected for communications associated with the user account at any give time.

In the present embodiment, the remapping request received by the host server from the source device includes the personal identification number of the target device, which is used by the host server for the remapping. The personal identification number of the target device may be obtained by the source device from the target device in the programming session, or alternatively may be manually entered via the user interface of the source device by the end user. If the remapping request is received by the host server from the target device, then the target device already has its personal identification number stored in its memory and no special procedure need be taken.

Assuming the remapping procedure is successful, the processor of the host server then causes a confirmation message regarding the switching of communications for the user account to be sent to the source device, the target device, or both (step 716 of FIG. 7). The source and/or target devices receive such confirmation message, where the processors of such devices may cause an indication to be displayed in the visual display associated with the switched status of the user account. At the source device, for example, the processor of the source device may cause an "inactive" indication to be displayed in the visual display which reads "USER ACCOUNT INACTIVE FOR THIS DEVICE". At the target device, for example, the processor of the target device may cause an "active" indication to be displayed in the visual display which reads "USER ACCOUNT ACTIVE FOR THIS DEVICE".

The processor of the host server may then receive an activation message from the target device, and activate the target device in response to this message (step 718 of FIG. 7). When successfully executed, the activation request initiates the data-synchronized communications between the host device and the target device. In one approach, the activation request from the target device must be received at the host server within a time period of a session which is established in response to the previous receipt of the remapping request. If the activation request is valid and received within the time period of the session, data synchronization is started; if the activation request is invalid or received at a time outside the time period of the session, no data synchronization is started.

When the procedure is completed, the host server is enabled to maintain data synchronization with the target device over the wireless communication network for the user data of the application program associated with the user account. For the new data-synchronized communications, the host server now maintains storage of a mapping of the user account name or identifier of the user account with the personal identification number of the target device. When communications are required with the target device, the personal identification number is used to route the messages to/from the target device through the system. Preferably, the data-synchronized communications are made secure with use of the encryption/decryption key (received by the target device during the programming session), where user data being transmitted from the host server are encrypted and user data being received at the host server are decrypted. Note that the source device is no longer enabled to maintain the data synchronization with the host server, unless and until the communications associated with the user account are switched back to the source device.

Although the source device is no longer enabled to maintain the data synchronization with the host server, the communications associated with the user account may be switched back to the source device with use of a subsequent remapping request. In this scenario, the target device actually becomes the new source device, and the source device becomes the new target device. The end user of the new source device causes a remapping request to be sent to the host server over the wireless communication network, so that the new target device may be enabled for the communications. The programming session between the source and target devices need not take place again since, after the initial programming session between the source device and the target device, both devices have all of the information necessary (which is maintained by each device regardless of its status) to be re-enabled for the data-synchronized communications associated with the user account.

Figure 8:
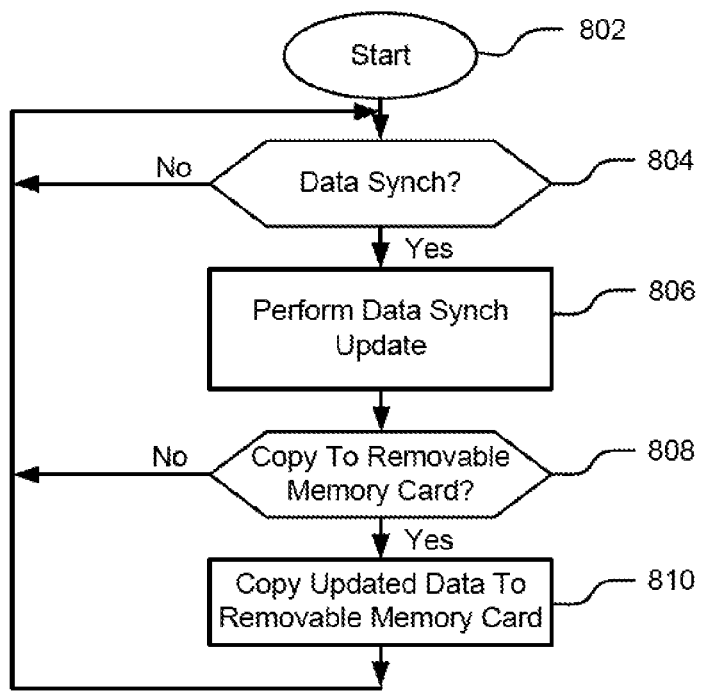
FIG. 8 is a flowchart which describes even another method for use in transferring user data associated with the user account from the source device to the target device, where the method is performed by the source device.

FIG. 8 is a flowchart which describes a method for use in transferring user data associated with the user account from the first ("source") mobile communication device to the second ("target") mobile communication device, where the method is performed by the first ("source") mobile communication device or its end user (where applicable). The techniques may be employed and/or utilized by the devices and components described earlier in relation to FIGS. 1-4. In particular, the method of FIG. 8 is performed by the source device (and/or end user thereof) to provide the target device with the user data of the application program associated with the user account. The techniques described in relation to the flowchart may be performed by one or more processors of the source device. A computer program product which may embody the technique may include a computer readable medium having computer instructions stored therein which are executable by the one or more processors for performing the technique. The application program of the host server and the source and target devices may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program.

In the technique of FIG. 8, a removable memory card is utilized to transfer the user data from the source device to the target device (e.g. see the previous description in relation to FIG. 4). Initially, the source device is operative to maintain data synchronization with the host server over the wireless communication network for user data of the application program associated with the user account. The user data is stored in memory of the source device, but a copy of the user data is also stored in the removable memory card. In the present embodiment, the removable memory card is a Secure Digital (SD) memory card. The SD memory card may be configured in accordance with SD card specification 1.01 or specification 1.1, for example.

Beginning at a start block 802 of FIG. 8, the processor of the source device identifies whether a data synchronization event in connection with the host server is ready (step 804 of FIG. 8). If not, the processor continues monitoring for such event. If the data synchronization event is ready at step 804, then the processor of the source device causes a data synchronization update to occur with the host server for user data of the application program associated with the user account (step 806 of FIG. 8). Here, user data of the application program may be updated in memory of the source device to be in synch with that of the host server. If the application program is an e-mail application, for example, the user account of the e-mail application at the host server may have received a new e-mail message, which was subsequently copied and delivered to the source device over the wireless communication network in the data synchronization update.

The processor then identifies whether the data synchronization update should be copied in memory of the removable memory card via the removable memory card interface (step 808 of FIG. 8). This test may be based on an indication' stored in memory of the source device which is selectable by the end user via the user interface, so that user data transfer ability via the removable memory card is an optional feature. If "yes" at step 808, the processor causes the user data (update) to be copied in memory of the removable memory card via the removable memory card interface (step 810 of FIG. 8). If "no" at step 808, the processor continues without executing step 810 and instead merely monitors for additional data synchronization events at step 804.

Preferably, the user data is provided in encrypted form prior to being copied in the removable memory card, so that encrypted user data is stored in the memory of the removable memory card. The user data is encrypted based on the encryption/decryption key retained by the device. In the present embodiment, the encryption/decryption key is stored in memory of the source and the target devices but not in the memory of the removable memory card. The encryption/decryption key may be wirelessly transmitted by the source device to the target device during the programming session as part of the user account data being transferred (e.g. see earlier discussion in relation to FIGS. 4-7). As apparent, the encryption/decryption key may be the same key as utilized for the data-synchronized communication with the . host server.

Also preferably, when user data for the synchronization update is received from (or transmitted to) the host server over the wireless communication network, the user data is received (or transmitted) in a type-length format. The type-length format may be referred to as a serialized format. User data that is provided in type-length format includes a type field having type data (e.g. which defines the type of user data such as e-mail, address book, calendar type data etc.), a data length field having data length of the user data which follows, and a data field having the user data corresponding to the specified type and data length. Prior to storing the user data in the device memory, this user data is reformatted by the source device from the type-length format into binary format; that is, the user data is "unserialized" by the source device. The user data in binary format is represented by data structures which are interpreted as "objects" of an object-oriented programming language (e.g. JAVA objects of a JAVA programming language) of the application program.

The copy of the user data may be stored in the removable memory card in this binary or unserialized format as well. Preferably, however, the copy of the user data in the removable memory card is stored in the type-length or serialized format. Therefore, the copy of the user data in the removable memory card may be stored as it is received over the wireless communication network. Over-the-air, the user data in the type-length format may further be provided in a compressed and encrypted format based on the encryption key. Therefore, prior to storing the user data in the device memory of the source device, the user data is decrypted, decompressed, and converted from the type-length format into the binary format. On the other hand, the copy of the serialized user data in the removable memory card may be stored as it is received over the wireless communication network in the compressed, encrypted, and serialized format.

At some point in time, especially when communications associated with the user account are switched from the source device to the target device (e.g. see discussion in relation to FIGS. 5-7 above), the removable memory card is physically transferred from the source device to the target device by the end user. When the removable memory card is received at the target device, the user data is automatically transferred from the memory of the removable memory card to memory of the target device. When the removable memory card is being transferred as part of the user account switch (e.g. see discussion in relation to FIGS. 5-7 above), the processors at the source device and/or the target device cause a prompt to be produced in the visual display for instructing the end user to transfer the removable memory card from the source device to the target device. Prior to storing the user data in the memory of the target device, the user data may decrypted, decompressed, and converted from the type-length format into the binary format as needed (i.e. depending on its format as stored in the removable memory card). After transfer of the user data, the target device may be enabled to maintain data synchronization with the host server over the wireless communication network for user data of the application program associated with the user account (e.g. see earlier discussion in relation to FIGS. 4-7).

Figure 9:
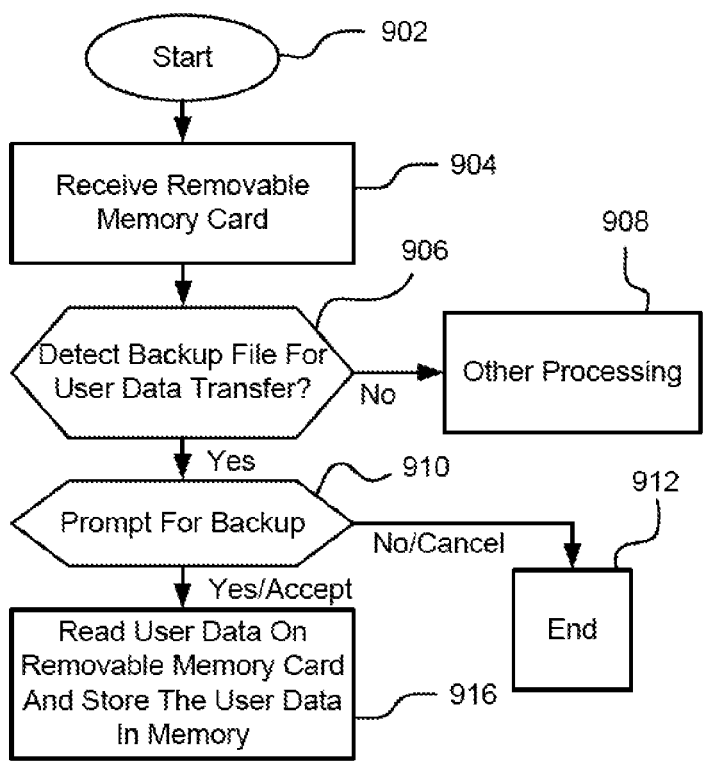
FIG. 9 is a flowchart which describes another method for use in transferring user data associated with the user account from the source device to the target device, where the method is performed by the target device.

FIG. 9 is a flowchart which describes another method for use in transferring user data associated with the user account from the first ("source") mobile communication device to the second ("target") mobile communication device, where the method is performed by the second ("target") mobile communication device. The techniques may be employed and/or utilized by the devices and components described earlier in relation to FIGS. 1-4. In particular, the method of FIG. 9 is performed by the target device (and/or end user thereof) to provide it with the user data of the application program associated with the user account. The techniques described in relation to the flowchart may be performed by one or more processors of the source device. A computer program product which may embody the technique may include a computer readable medium having computer instructions stored therein which are executable by the one or more processors for performing the technique. The application program may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program.

In the technique of FIG. 9, a removable memory card is utilized to transfer the user data from the source device to the target device (e.g. see the previous description in relation to FIG. 4). Initially, the source device is operative to maintain data synchronization with the host server over the wireless communication network for user data of the application program associated with the user account. The user data is stored in memory of the source device, but a copy of the user data is also stored in the removable memory card. In the present embodiment, the removable memory card is a Secure Digital (SD) memory card. The SD memory card may be configured in accordance with SD card specification 1.01 or specification 1.1, for example.

Beginning at a start block 902 of FIG. 9, the removable memory card is physically transferred from the source device to the target device by the end user (step 904 of FIG. 9). The removable memory card is received, in particular, at the removable memory card interface of the target device. This card transfer may occur when communications associated with the user account are switched from the source device to the target device (e.g. see discussion in relation to FIGS. 5-7 above). When the removable memory card is being transferred as part of the user account switch (e.g. see discussion in relation to FIGS. 5-7 above), the processors at the source device and/or the target device may cause a prompt to be produced in the visual display for instructing the end user to transfer the removable memory card from the source device to the target device.

When the removable memory card is received at the target device, the processor of the target device automatically detects whether a backup or user data file is stored in the removable memory card (step 906 of FIG. 9). If "no" at step 906, the processor operates to process other non-related events (step 908 of FIG. 9). If "yes" at step 906, the processor may cause a prompt to be visually displayed in the visual display of the target device to ask the end user whether or not the user data from the removable memory card should be transferred to memory for use (step 910 of FIG. 9). If "no" at step 910, then the processor ends the process (step 912 of FIG. 9). If "yes" at step 910, the processor causes the user data to be read from the memory of the removable memory card and stored in memory of the target device (step 916 of FIG. 9). After transfer of the user data, the target device may be enabled to maintain data synchronization with the host server over the wireless communication network for user data of the application program associated with the user account (e.g. see earlier discussion in relation to FIGS. 4-7).

Preferably, the user data is encrypted in the removable memory card, and the processor operates to decrypt the user data prior to it being saved in the memory of the target device. In the present embodiment, the encryption/decryption key is stored in memory of the source and the target devices but not in the memory of the removable memory card. In addition, the encryption/decryption key is wirelessly received by the target device from the source device during the programming session as part of the user account data being transferred (e.g. see earlier discussion in relation to FIGS. 4-7). This encryption/decryption key may be the same key as utilized for the data-synchronized communication with the host server.

As described earlier above, the copy of the user data may be stored in the removable memory card in the binary format. Preferably, however, the copy of the user data in the removable memory card is stored in the type-length format. The type-length format may be referred to as a serialized format. User data that is provided in type-length format includes a type field having type data (e.g. which defines the type of user data such as e-mail, address book, calendar type data etc.), a data length field having data length of the user data which follows, and a data field having the user data corresponding to the specified type and data length. Prior to storing the user data in the device memory of the target device, this user data is reformatted by the target device from the type-length format into binary format; that is, the user data is "unserialized" by the target device. The user data in binary format is represented by data structures which are interpreted as "objects" of an object-oriented programming language (e.g. JAVA objects of a JAVA programming language) of the application program. The user data in the type-length format may further be provided in the removable memory card in a compressed and encrypted format based on the encryption key. Therefore, prior to storing the user data in the memory of the target device, the user data may be decrypted, decompressed, and converted from the type-length format into the binary format as needed (i.e. depending on its format as stored in the removable memory card).

Thus, methods and apparatus for use in transferring user data from a first ("source") mobile communication device to a second ("target") mobile communication device using a removable memory card have been described. The source and target devices may be possessed and/or owned by the same end user. The source device is initially enabled to maintain data synchronization with a host server over a wireless communication network via a first wireless transceiver (e.g. a cellular transceiver) for user data of an application program (e.g. an e-mail application program) associated with the user account. To enable the target device for the communications associated with the user account, the source device is operative to establish a programming session with the target device via a second wireless transceiver (e.g. a short-range wireless transceiver). During the programming session, the source device causes user account data (e.g. at least one encryption/decryption key for the data-synchronized communications) for the user account to be transmitted to the target device via the second wireless transceiver. Preferably, the user account data is encrypted based on a passkey for the programming session. The user data associated with the application program may also be transferred from the source device to the target device during the programming session. With this data, the target device is thereby enabled to maintain data synchronization with the host server for the user data of the application program associated with the user account.

In the preferred embodiment, the source device is operative to maintain data synchronization with the host server over the wireless communication network for the user data, store the user data in memory of the source device, and further copy the user data in a removable memory card (e.g. a secure digital or SD card) in the source device. When the user data is desired at the target device, the removable memory card is physically transferred from the source device to the target device. After the removable memory card is inserted in the target device, the processor of the target device causes the user data to be transferred from the removable memory card to memory of the target device where it is stored. Subsequently, data synchronization may be maintained between the target device and the host server over the wireless communication network for the user data. Preferably, an encryption/decryption key for the user data is maintained in memory of the source and the target devices but not in the removable memory card. The user data is decrypted in accordance with the encryption/decryption key prior to storing it in memory of the target device. Advantageously, most if not all of the account switching steps may be facilitated by the end user "on-the-fly" without third-party involvement.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in transferring user data associated with a user account from a first mobile communication device having a first personal information manager (PIM) application to a second mobile communication device having a second PIM application, the first mobile communication device including a memory, an interface configured to receive a removable memory card, and first and second wireless transceivers, the method comprising:
 maintaining storage of an encryption/decryption key in the memory;
 refraining from maintaining encryption/decryption key in the removable memory card;
 maintaining data synchronization of the user data, via a wireless communication network using the first wireless transceiver, between the first mobile communication device having the PIM application and a host server;
 for the data synchronization:
  regularly receiving and storing updates to the user data in the memory for use in the first PIM application;
  for updates to the user data, updating a copy of the user data stored in the removable memory card in an encrypted format in accordance with the encryption/decryption key;
 causing the encryption/decryption key to be transmitted to the second mobile communication device via the second wireless transceiver;
 after the removable memory card is transferred from the first mobile communication device to the second mobile communication device, copying the user data from the removable memory card to memory of the second mobile communication device; and
 maintaining data synchronization of the user data, via the wireless communication network, between the second mobile communication device having the second PIM application and the host server.

2. The method of claim 1,
 wherein the user data is communicated over the wireless communication network in an encrypted format in accordance with the encryption/decryption key during the data synchronization for the first mobile communication device.

3. The method of claim 1, further comprising:
 causing a prompt to be produced, via a user interface of the second mobile communication device, to initiate the transfer of the copy of the user data from the removable memory card to the memory of the second mobile communication device.

4. The method of claim 1, further comprising:
 causing a prompt to be produced, via a user interface of the first mobile communication device, to prompt the transfer of the removable memory card from the first mobile communication device to the second mobile communication device.

5. The method of claim 1, wherein the user data comprise electronic mail (e-mail) messages.

6. The method of claim 1, wherein the removable memory card comprises a secure digital (SD) card.

7. The method of claim 1, further comprising:
 causing the encryption/decryption key to be transmitted to the second mobile communication device via the second wireless transceiver in a programming session.

8. The method of claim 1,
 wherein the user data is communicated over the wireless communication network in an encrypted format in accordance with the encryption/decryption key during the data synchronization for the second mobile communication device.

9. The method of claim 1, further comprising:
 during the data synchronization: receiving, over the wireless communication network, the user data in a type-length format;
 converting the user data in the type-length format into a binary format;
 regularly receiving and storing the updates to the user data in the binary format in the memory of the first mobile communication device for the first PIM application;
 upon receiving each update to the user data, updating the copy of the user data in the type-length format in the removable memory card.

10. The method of claim 1, further comprising:
 during the data synchronization: receiving, over the wireless communication network, an update to the user data in an encrypted, type-length format;

decrypting the update to the user data from the encrypted, type-length format into a decrypted, type-length format;
converting the update to the user data from the decrypted, type-length format into a binary format;
storing the update to the user data in the binary format in the memory of the first mobile communication device for the first PIM application; and
updating the copy of the user data in the encrypted, type-length format in the removable memory card.

11. The method of claim 1, wherein the act of updating comprises updating the copy of the user data stored in the removable memory card in an encrypted format, and wherein the act of copying comprises copying the user data from the removable memory card to the memory of the second mobile communication device in a decrypted format.

12. The method of claim 1, wherein the data synchronization comprises at least one of address book synchronization for address book contacts in an address book organizer and calendar appointment synchronization for calendar appointments in a calendar application program.

13. A communication system, comprising:
a first mobile communication device, including:
  one or more processors;
  a first wireless transceiver coupled to the one or more processors;
  a second wireless transceiver coupled to the one or more processors;
  a memory coupled to the one or more processors and storing an encryption/decryption key;
  the memory for storing a first personal information manager (PIM) application having user data associated with a user account;
  an interface coupled to the one or more processors which is configured to receive a removable memory card, the removable memory card refraining from storing the encryption/decryption key;
  the one or more processors being configured to:
    maintain data synchronization of the user data, over a wireless communication network via the first wireless transceiver, with a host server;
    for the data synchronization: regularly receive and store updates to the user data in the memory of the mobile communication device for use in the first PIM application; and
    for updates to the user data, update a copy of the user data stored in the removable memory card in an encrypted format in accordance with the encryption/decryption key;
    cause the encryption/decryption key to be transmitted to a second mobile communication device via the second wireless transceiver;
the second mobile communication device, including:
  one or more processors;
  a wireless transceiver coupled to the one or more processors;
  memory coupled to the one or more processors;
  the memory for storing a second PIM application;
  an interface coupled to the one or more processors which is configured to receive the removable memory card;
  the one or more processors being configured to:
    after the removable memory card is transferred from the interface of the first mobile communication device to the interface of the second mobile communication device, copy the user data from the removable memory card to memory of the second mobile communication device; and
    maintain data synchronization of the user data, via the wireless transceiver, with the host server for use in the second PIM application.

14. The communication system of claim 13, wherein the user data is communicated over the wireless communication network in an encrypted format in accordance with the encryption/decryption key during the data synchronization for the first mobile communication device.

15. The communication system of claim 13, wherein the one or more processors of the second mobile communication device are further configured to:
cause a prompt to be produced, via a user interface of the second mobile communication device, to initiate the transfer of the copy of the user data from the removable memory card to the memory of the second mobile communication device.

16. The communication system of claim 13, wherein the first and the second mobile communication devices comprise cellular telephones.

17. The communication system of claim 13, wherein the removable memory card comprises a secure digital (SD) card.

18. The communication system of claim 13, wherein the user data is communicated over the wireless communication network in an encrypted format in accordance with the encryption/decryption key during the data synchronization for the second mobile communication device.

19. The communication system of claim 13, wherein the user data comprise electronic mail (e-mail) messages.

20. The communication system of claim 13, wherein the first wireless transceiver comprises a cellular transceiver and the second wireless transceiver comprises a short-range wireless transceiver.

* * * * *